United States Patent [19]

Phillips, Jr.

[11] 4,191,985

[45] * Mar. 4, 1980

[54] INTERRUPTER

[76] Inventor: Charles M. Phillips, Jr., 315 Haven St., Clearwater, Fla. 33516

[ * ] Notice: The portion of the term of this patent subsequent to Feb. 21, 1995, has been disclaimed.

[21] Appl. No.: 833,767

[22] Filed: Sep. 16, 1977

Related U.S. Application Data

[63] Continuation-in-part of Ser. No. 644,422, Dec. 24, 1975, Pat. No. 4,075,676, and a continuation-in-part of Ser. No. 713,844, Aug. 12, 1976.

[51] Int. Cl.² .......... H02H 3/22

[52] U.S. Cl. .......... 361/56; 337/34; 339/14 P; 361/55; 361/104; 361/119

[58] Field of Search .......... 361/56, 54, 55, 104, 361/91, 118, 119; 337/15, 17, 20, 28, 31, 32, 34, 265, 266, 197, 198, 282; 339/14 P, 111, 147 P, 75 P, 176 P

[56] References Cited

U.S. PATENT DOCUMENTS

| | | | |
|---|---|---|---|
| 2,988,617 | 6/1961 | Graziosi | 337/197 |
| 3,255,330 | 6/1966 | MacKenzie et al. | 361/124 |
| 3,274,447 | 9/1966 | Nelson | 361/119 |
| 3,353,066 | 11/1967 | De Souza | 361/104 X |
| 3,546,692 | 12/1970 | Salzer | 361/104 X |
| 3,793,560 | 2/1974 | Schultheis | 361/104 |
| 3,821,686 | 6/1974 | Harnden, Jr. | 361/56 X |
| 3,840,781 | 10/1974 | Brown | 361/119 X |
| 3,889,222 | 6/1975 | Takano et al. | 361/118 X |
| 4,023,071 | 5/1977 | Fussell | 361/118 X |
| 4,075,676 | 2/1978 | Phillips, Jr. | 361/118 X |

*Primary Examiner*—Patrick R. Salce

*Attorney, Agent, or Firm*—Fidelman, Wolffe & Waldron

[57] ABSTRACT

A device, for protecting electrical equipment and appliances from electrical surges, having: male prong members to connect the device to an electrical outlet; a female receptacle to receive a plug of the equipment or appliance; current diverting means including a varistor and thermofuse for interrupting current at the female receptacle upon the occurrence on the line feeding the outlet of transient voltage spikes and surges exceeding a predetermined voltage level. The electrical outlets include power outlets and telephone connectors of the multi-prong or coaxial type. Equipment which may be protected by an embodiment of this device includes devices e.g. recorders, computer terminals, which may be connected to the telephone lines.

9 Claims, 12 Drawing Figures

INTERRUPTER

BACKGROUND OF THE INVENTION

The application is a continuation-in-part of my copending application Ser. No. 644,422 filed Dec. 24, 1975; now U.S. Pat. No. 4,075,676 for INTERRUPTER, and my copending application Ser. No. 713,844 filed Aug. 12, 1976 for INTERRUPTER.

FIELD OF THE INVENTION

This invention relates generally to electrical protective devices and, more particularly, to a device for interrupting electrical current to an electrical appliance, and to telephone equipment connected to the telephone lines, upon the occurrence of excess values of electrical voltage.

DESCRIPTION OF THE PRIOR ART

When most electrical appliances are connected to the usual wall receptacle they are connected electrically to a power line without any protection against surges of electric current which might seriously damage them. Generally, the only safety devices in these power lines are fuses or circuit breakers which are adapted to burn out or open when the lines that they service sense a current overload. These devices are not adequate to protect appliances since a current overload which might be less than required to open the circuit breaker or burn out a fuse might still be great enough to damage the appliance. Typically, these current overloads result from voltage surges caused by lightning striking the structure in which these appliances are housed, or by striking an exposed power line. Equipment connected to telephone lines is similarly jeopardized upon the occurrence of nearby lightning strokes or other conditions putting transient voltage spikes on the lines.

A solution to this problem is the isolator presented by James F. Worthington in U.S. Pat. No. 3,539,961. The isolator had a male plug member and a female receptacle electrically interconnected by fusible wire. An arc plate, connected to a third prong, is disposed adjacent the male prong members of the isolator so when current in excess of a predetermined value flows through the device, the fuse wire is melted or burned out and the current is carried by the arc plate to ground, thereby effectively isolating the appliance and saving it from damage. In actual practice, the fusible wire did not consume itself rapidly enough to prevent excess, damaging current from reaching the appliance.

Another solution to this problem is presented in my pending application, INTERRUPTER, Ser. No. 644,422, filed Dec. 24, 1975, wherein a voltage responsive resistive element, e.g. varistor, carbon pellet arrester, gas ionization tube, is used to short circuit the female receptacle when a power surge condition occurs. This is an improvement over the isolator of Worthington, in that it is faster and self-restoring; however, the varistors and carbon pellets when heated by high current flow are relatively slow to regain their normal operating characteristics, and the gas ionization tube does not extinguish until voltage has fallen to a low level.

My pending application, INTERRUPTER, Ser. No. 713,844 discloses a device where a spark gap is used to short circuit the female receptacle when a power surge condition occurs. This is a fast, self restoring device which is able to repeat operation immediately after initial firing.

Both pending applications, Ser. No. 644,422 and Ser. No. 713,844 are to be considered as incorporated herein.

SUMMARY OF THE INVENTION

The present invention is a single-use current interrupting device for use with household appliances connected to the conventional female wall type outlets and also for use with equipment connected to telephone lines using, for examples, prong type male connectors and mating female receptacles or coaxial male and female connectors. A varistor and a thermofuse, electrically in series, are placed across the line terminals. Thermodynamically the varistor and thermofuse are connected, for example, taped together, such that a high level of heat generated by the varistor causes the thermofuse to open. The thermofuse does not reset and requires replacement.

When there is a large surge or spike on the lines, the increased voltage causes the resistance of the varistor to drop substantially thereby bypassing current away from the connected load. Heat generated by the high varistor current actuates the thermofuse to open the bypass circuit and again allow current flow to the connected load. Accordingly the power surge or spike provides a temporary short term period during which the connected load is protected. A neon light is used to indicate whether or not the interrupter has been expended.

Male means extend perpendicularly from the rear wall of the interrupter and connect with contacts in the female receptacle. Male prong means and contacts extend perpendicularly in opposite direction from opposite ends of a conductive element. The grounding prong means for the conventional appliance connector is generally L-shaped, extends parallel to the rear wall and is connected to the grounding female contact by a conductive element. Each male prong means, the corresponding female contact and each conductive element is unitary, being formed from a single piece of conductive material.

OBJECTS OF THE INVENTION

An object of the present invention is to provide an economical electrical surge and lightning protection device for household appliances and for equipment connected to telephone lines.

A further object of the present invention is to provide a fail-safe electrical surge protection device having a minimum number of parts and which is usable with two aperture household type outlets.

Another object of the present invention is to provide a protection device which electrically disengages from the protected lines after actuation.

Other objects, advantages, and novel features of the present invention will become apparent from the following detailed description of the invention when considered in conjunction with the accompanying drawings.

DESCRIPTION OF A PREFERRED EMBODIMENT

Figure 1:
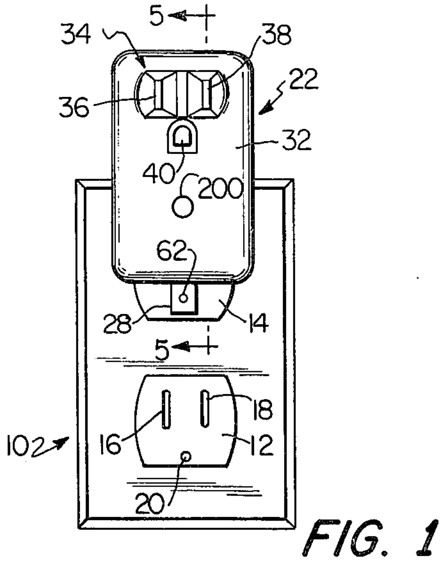
FIG. 1 is a pictorial illustration of an interrupter constructed according to the invention installed in a conventional wall outlet.
Figure 2:
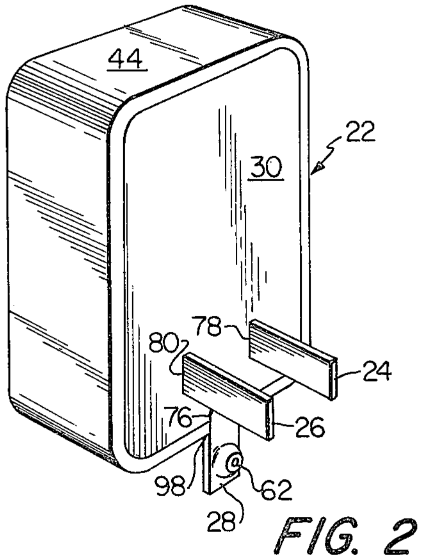
FIG. 2 is a perspective view of the interrupter of FIG. 1.

Referring now to the drawings for a detailed description of the invention, FIG. 1 shows a typical electrical wall outlet 10 having two female receptacles 12 and 14. As can be seen for female receptacle 12, three apertures are provided having a hot aperture 16, a neutral aperture 18 and a grounded aperture 20. Plugged into the three apertures of female receptacle 14 is a preferred embodiment of the current interrupter 22 of the present invention. In use male prongs 24 and 26 and grounding prong 28, illustrated in FIG. 2, are received in apertures 16, 18 and 20, respectively, of a wall outlet. As can be seen from FIG. 2, a hot male prong 24 and a neutral male prong 26 extend generally perpendicular from the back wall or plate 30 of the interrupter 22 and the ground prong 28 extends generally parallel to the back wall or plate 30 of the interrupter 22. On the front wall 32 of the interrupter 22 is a female receptacle 34 having hot, neutral and ground apertures 36, 38 and 40, respectively. A small neon bulb 200 is also provided in the front wall 32 for indicating the protective status of the interrupter 22. As will be explained more fully below, the electrical appliance which is to be protected from voltage and current surges is plugged into female receptacle 34.

As can be seen from FIGS. 1 and 2, the interrupter 22 is designed so that it fits entirely within a housing containing two pieces, i.e., back plate 30 and a five sided housing 44. These two pieces are preferably made of high impact plastic material or any equivalent electrically insulated material. The only externally visible electrical parts of the device are the male prongs 24, 26 and 28 which extend from the lower portion of the housing and the female receptacle 34 on the face of the housing. Thus, a compact non-obstrusive protective device is provided. The minimum number of parts needed for the assembly and operation of the interrupter will be discussed in reference to FIGS. 3, 4 and 5.

Figure 3:
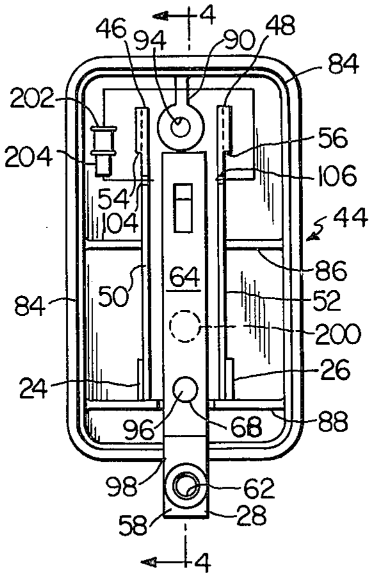
FIG. 3 is a rear elevational view of the interrupter of FIG. 1 with the back plate removed.
Figure 4:
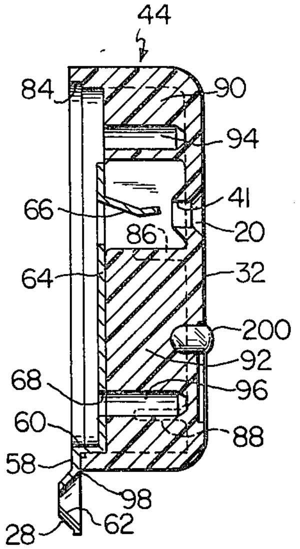
FIG. 4 is a sectional view of the interrupter housing and grounding prong taken along line 4—4 of FIG. 3.
Figure 5:
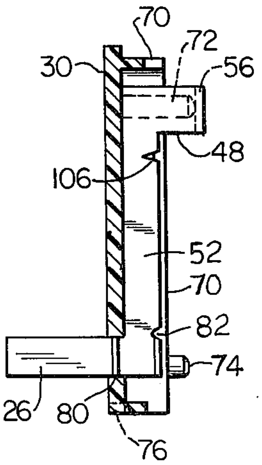
FIG. 5 is a sectional view of the back plate and grounding prong of the interrupter taken along line 5—5 of FIG. 1.

As illustrated specifically in FIGS. 3 and 5, the male prongs 24 and 26 are connected to contacts 46 and 48, respectively, of female receptacle 34 by conductive elements 50 and 52, respectively. The ends of the female contacts 46 and 48 are slightly beveled at 54 and 56. Each male prong and the connected female contact and conductive element is a unitary component being formed of a single piece of conductive material, for example, brass. The male prongs, 24 and 26, extend essentially perpendicularly from one end of the conductive elements, 50 and 52, respectively, in a first direction and the female contacts 46 and 48 extend essentially perpendicular from the other end of conductive elements 50 and 52, respectively, in a direction opposite of the male prongs 24 and 26. As will be explained below in a detailed description of the back plate 30 and housing 44, the unitary conductive structures of the present invention are held in place and electrically insulated from each other by the internal structure of the housing and back plate and no additional insulation or fasteners are needed.

The grounding prong 28 is generally L-shaped having a longer portion 58 and a shorter portion 60. The longer portion 58, which is generally parallel to the back plate 30 of the housing and generally perpendicular to the bottom of the housing, has an aperture 62 therein. As can be seen in FIG. 1, the aperture 62 is located relative to the housing and other prongs 24 and 26 so as to lie in the ground aperture 20 of female receptacle 14 when connected to a wall outlet 10. If the interrupter is used in a two aperture female receptacle, the ground prong 28 may be connected to any other ground using the aperture 62 and a fastener. The short portion 60 of the L-shaped ground prong 28 extends at a right angle from a rectangular conductive element 64. Extending from and adjacent to the other end of conductive element 64 is a female ground contact 66 which extends below the roof surface 41 of the ground aperture 40, FIG. 4, of a female receptacle 34. As with the hot and neutral prongs and female contacts, the grounding prong 28, the conductive element 64 and the female contact 66 are unitary, being formed of a single piece of conductive material. An aperture 68 is provided in the conductive element 64, as to be explained more fully, so as to help retain the ground element in place.

The back 30 of the housing, as illustrated in FIG. 5, is a generally rectangular surface having a ridge 70 adjacent to the edge of the surface and forming a recessed interior region. A pair of pins 72 and 74 extend from the center of the back 30 and are constructed so as to press fit into apertures in the housing 44. A rectangular opening 76 is provided in the back plate 30 to allow the contact 28 to extend from the housing. Apertures 78 and 80 are also provided in the plate 30 so as to allow male prongs 24 and 26 to extend therefrom. Adjacent apertures 78 and 80 and forming interior portions of ridge 70 are a pair of walls 82 surrounding pin 74. These walls 82 align the prongs 24 and 26 relative to the apertures 78 and 80 and help insulate the conductive portions 50 and 52 from each other.

The main portion of the housing 44 is a five sided generally rectangular closure. An internal shoulder 84 is provided adjacent the external wall so as to receive the back plate 30 of the housing with the ridge 70 lying adjacent to the internal portion of the side walls of housing 44. The interior of housing 44 includes transverse ribs 86 and 88 and longitudinal ribs 90 and 92. Transverse ribs 86 and 88 are of sufficient height to support conductive elements 50 and 52 and ribs 90 and 92 are of sufficient height to support the grounding conductive elements 64. Also provided as a portion of ribs 90 and 92 are apertures 94 and 96 which receive, in a force fit relationship, pins 72 and 74 of the back plate 30. Aperture 68 of the grounding conductive element is superimposed or aligned with aperture 96. A rectangular opening 98 is provided in the bottom side wall of the housing 44 to allow a portion 58 of the male grounding prong 28 to extend from the housing.

Electronic circuitry which provides the interruption of current between the male prongs 24, 26 and the female outlet 34 is illustrated functionally in FIG. 3, as including a voltage responsive varistor element 202 and thermofuse 204 in series. The leads of the series elements 202, 204 are received in slots 104 and 106, respectively, of conductive elements 50 and 52 (see FIG. 5). Thus, the voltage responsive varistor 202 and thermofuse 204 form a circuit between the electrically hot conductive element 50 and the neutral conductive element 52.

Figure 6:
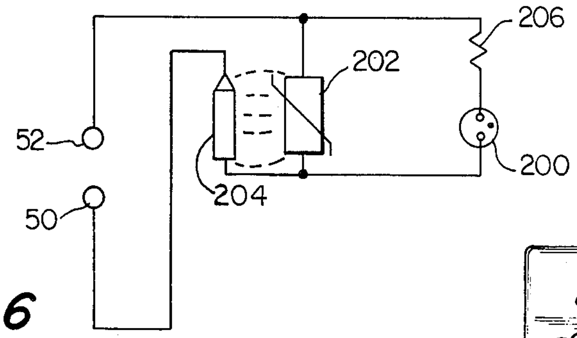
FIG. 6 is a schematic circuit of the invention of FIG. 1.
Figure 12:
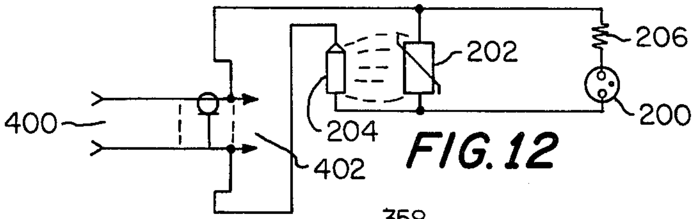
FIG. 12 is a schematic circuit of the invention of FIGS. 10 and 11.
Figure 9:
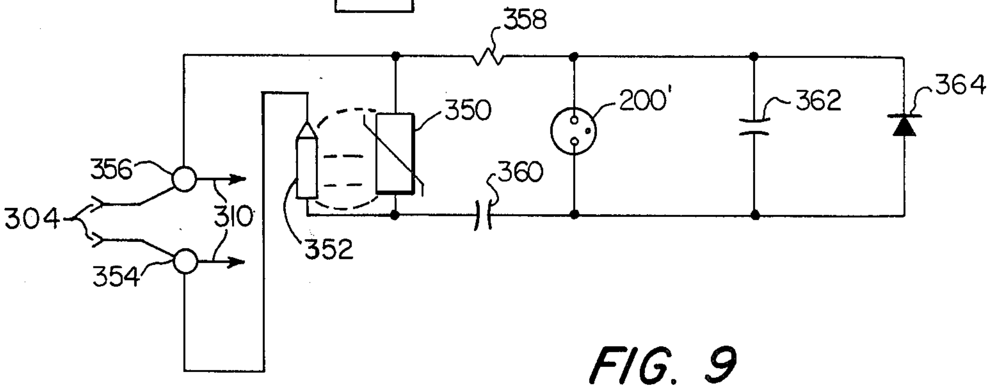
FIG. 9 is a schematic circuit of the invention of FIGS. 7 and 8.

The varistor 202 is a well-known element having a resistance which decreases when voltage increases. The thermofuse 204 is a well-known element which at normal temperature appears as a short circuit. When heated, a spring release (not shown) within the thermofuse 204 actuates to present an open circuit. The fuse 204 does not reset; it is a one-use device and must be replaced after activation. The thermofuse 204 and varistor 202 are in direct physical contact, one to the other as represented semi-schematically in FIG. 3. This joining may be effected in any suitable manner, for examples by taping or adhesive, whereby heat variations generated by the varistor 202 are imposed thermodynamically on the thermofuse 204 with only a short time delay. In FIGS. 6, 9 and 12, the varistor and thermofuse are illustrated side-by-side, and broken lines extend between them to represent the cooperative thermal relationship between these two components.

Accordingly when normal voltages are on the lines 16, 18, the varistor presents a high impedance to current flow and flow of current from the male prongs 24, 26 to the female receptacle 34 is normal. When voltages exceeding the acceptable level, e.g. caused by lightning, power malfunction, occur across the lines between the conductive elements 50, 52 the resistance of the varistor 202 decreases allowing a substantial current to flow through the varistor 202 and thermofuse 204. Further, higher current flowing through the resistive varistor 202 generates increased heating, in the known manner, which affects the thermofuse 204 and causes it to open after a short time delay. During the short time period when the varistor resistance is low and varistor current is high, and prior to opening of the thermofuse 204, this circuit path bypasses the current which would otherwise flow into a connected device e.g. household appliance, and protects it from the voltage surge.

Once the thermofuse 204 has actuated to the open circuit condition, the interrupter 22 is no longer electrically active to protect devices connected to the line. However, the connected devices operate normally thereafter.

In a preferred embodiment of the instant invention a neon bulb 200 showing on the face of the interrupter front wall 32 indicates the protective status of the interrupter 22. As seen in the schematic circuit of FIG. 6, the neon bulb 200 and the resistor 206 are in series across the varistor 202. Accordingly when the varistor resistance is high the voltage across the conductive elements 50, 52 also appears across the resistor 206 and bulb 200 causing the lamp to glow. After the thermofuse 204 has actuated in protecting against a high voltage, the circuit is open; there is no voltage drop across the varistor 202 and the bulb 206 does not glow. Thus the user is informed whether or not a new interrupter is required on the line to provide further protection.

In an embodiment of this interrupter 22 which performed satisfactorily a GE Varistor V170LA10A and 3M-DO76-002 thermofuse were utilized with a 30–100 K ohm resistor and C4A neon bulb.

In an alternative embodiment of this invention the neon bulb 200 and resistor 206 may be omitted from the circuit. An ohmeter is then required to determine whether the thermofuse 204 presents a short or open circuit.

As can be seen from the detailed description of a preferred embodiment of the present invention, a minimum of parts, i.e., a unitary housing with a back plate, three unitary electrical conductors including male prongs and female contacts, and standard electronic components are used to provide an inexpensive and compact current interrupter to protect electrical equipment from voltage surges on the power line. By providing unitarily formed elements and eliminating excess connectors, fasteners, etc., the cost of the present interrupter is reduced and reliability extended.

Figure 7:
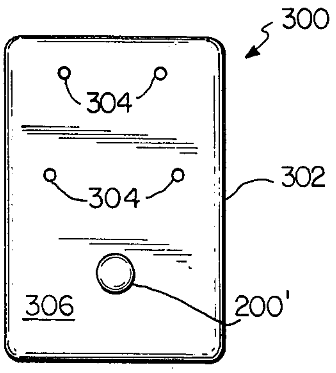
FIGS. 7 and 8 are front and side view representations respectively of an alternative embodiment of this invention for use with telephone equipment.
Figure 8:
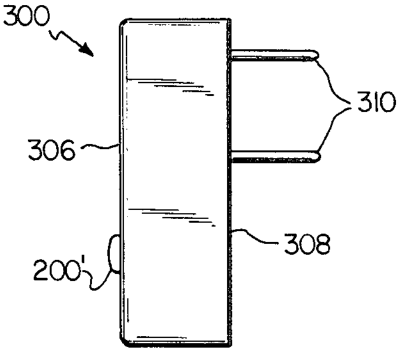

In an alternative embodiment of this invention the interrupter 300 (FIGS. 7,8) is used to protect equipment connected to telephone lines. This equipment may include, for examples, telephone answering and recording devices, computer terminals, etc. The principles of operation are exactly as described above and accordingly are not repeated in detail here. Principally the interrupter includes an enclosure 302 having a plurality of female receptacles 304 on its face 306. Extending from the rear surface 308 are a plurality of male prongs 310 connected internally (not shown), one to one, with the female receptacles 304. The neon bulb 200' shows from the front surface 306.

The number and pattern of prongs 310 and receptacle 304 on the interrupter 300 exactly conform to the pattern and number of prongs and receptacles associated with a telephone line. Thus the interrupter 300 is plugged into the telephone receptacle (not shown) and the equipment to be protected (not shown) which otherwise would plug directly into the telephone receptacle, is plugged instead into the female receptacles 304 of the interrupter 300. The inner circuitry of the interrupter 300 is the same as in FIG. 6 except that the terminals 50, 52 now represent the telephone ringing lines. The varistor 202 and thermofuse 204 as above are thermally connected, one to the other. Operation of the circuit, the interrupter 300, and its neon bulb indicator 200' to protect the connected equipment are as described above for the appliance circuits and are not described again in detail here. On a voltage surge, power on the ringing lines is momentarily diverted by the interrupter 300 from the equipment plugged into the interrupter 300.

In an alternative embodiment of this telephone lie protecting interrupter 300, the inner circuit is as illustrated in FIG. 9. The varistor 350 and thermofuse 352, joined together thermally as described above, are connected in series across the telephone power lines 354, 356. When voltage across the lines 354, 356 is normal the varistor 350 presents a high impedance and current is not diverted from any load connected across said lines 354, 356. The thermofuse 352, as described above, presents a short circuit until it is opened by heating from the varistor 350. Such heating occurs, as aforesaid, when a line voltage surge causes the varistor resistance to decrease and divert current flow from the connected load whereby the thermofuse 352 is heated and opens.

A resistor 358, neon bulb 200' and capacitor 360 are in series across the varistor 350. When the varistor 350 is in a normal high impedance state the neon bulb 200' glows. In the event of a voltage surge or spike, due, for example, to lightning, which causes the thermofuse 352 to be opened, as aforesaid, the interrupter circuit is electrically removed from the lines 354, 356 and the bulb 200' is extinguished. A capacitor 362 and a diode 364 each shunt the neon bulb 200'. The diode 364, rectifies any surge pulse cycles or any pulsing DC on the ringing line, and stops any oscillations or ringing effects which might be induced on the line by the interrupter circuitry.

In an alternative embodiment, the capacitor 362 and diode 364 shunting the neon bulb 200' may be omitted from the circuit. This embodiment may be found to perform well in certain localities across the country.

In an embodiment, according to FIG. 9, which performed well, a G.E. V130LA20B varistor was used with a 3M DO76-002 thermofuse. The resistor 358 was 30–100 K ohms; the capacitor 362 was 0.0056 microfarads; the capacitor 360 was 0.1 microfarads and the diode 364 was G.E. IN 5062. A C4A neon bulb was used.

It should be noted that the fuse does not melt, i.e. 'burn out,' in the conventional sense. Rather the fuse opens because of the temperature rise. This effectively clears the power lines of the heated varistor and eliminates any potential fire hazard from that source.

Figure 10:
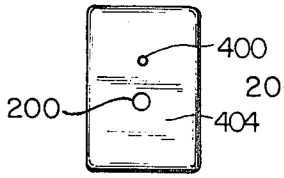
FIGS. 10 and 11 are front and side view representations respectively of another alternative embodiment of this invention.
Figure 11:
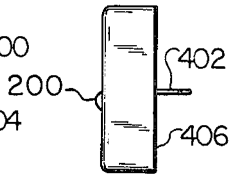

While the interrupter has been described with reference to embodiments having a female receptacle for reception of active prongs, and male plug members with electrically conductive prongs, the invention can also be practiced in embodiments using conventional coaxial lead receptacles and coaxial plugs. This is a common means of connection to telephone lines. FIGS. 10 and 11 illustrate an interrupter having a single female coaxial receptacle 400 on the front surface 404 and a single male coaxial plug connector 402 extended from the rear surface 406. The plug connector 402 fits into a conventional coaxial telephone outlet, and the equipment to be protected which otherwise would plug into the outlet is instead plugged into the female receptacle 400 of the interrupter. The neon bulb 200', as described above, indicates the protective status of the circuit. FIG. 12 schematically illustrates the circuit with coaxial connectors.

In another alternative embodiment of this invention the one-use thermofuse may be replaced by a thermostatic relay device which after a period of cooling recloses (after an opening) to restore protection to the lines. In still another alternative embodiment of this invention a thermal relay device may be used which is manually reset after opening.

From the preceding description of the preferred embodiment, it is evident that the objects of the invention are attained and although the invention has been described and illustrated in detail, it is to be clearly understood that the same is by way of illustration and example only and is not to be taken by way of limitation. The spirit and scope of this invention is limited only by the terms of the appended claims.

What is claimed is:

1. An interrupter device for interrupting electrical current used by a household electrical appliance and for diverting current from electrical equipment connected to telephone lines, comprising:

a housing supporting a grounding prong means and two prong means adapted to be inserted into a grounded electrical outlet and a female receptacle including three apertures adapted to receive the electrical plug connector of an appliance;

a plurality of conductor means for electrically interconnecting of each same prong means to a corresponding element of said female receptacle, said plurality of conductor means including three conductive elements being unitary portions of said prong means and forming contact portions below said appertures of said female receptacle;

two of said conductive elements being rectangular and each having a unitary prong means extending substantially perpendicular from one end of said conductive elements in a first direction and a contact portion extending substantially perpendicular from the other end of said conductive elements in an direction opposite said first direction;

variable impedance means connected between two conductors of said interconnecting conductor means for temporarily interrupting current flow to said female receptacle at high voltage levels by creating a path of low resistance between said two interconnecting conductor means, said variable impedance means including a varistor in series with a thermofuse, said varistor and said thermofuse being in thermal cooperation whereby heat generated by said varistor causes said thermofuse to actuate and said thermofuse becomes an open circuit.

2. The interrupter device of claim 1 wherein said varistor and said thermofuse are physically contacting one to the other.

3. The interrupter device of claim 1 further comprising a neon bulb across said varistor, whereby said bulb glows to indicate when said appliance or said equipment is protected by said interrupter.

4. An interrupter device for interrupting electrical current used by a household electrical appliance and for diverting current from electrical equipment connected to telephone lines, comprising:

a housing supporting a grounding prong means and two prong means adapted to be inserted into a grounded electrical outlet and a female receptacle including three apertures adapted to receive the electrical plug connector of an appliance;

a plurality of conductor means for electrically interconnecting of each same prong means to a corresponding element of said female receptacle, said plurality of conductor means including three conductive elements being unitary portions of said prong means and forming contact portions below said appertures of said female receptacle;

one of said conductive elements being rectangular and having an L-shaped grounding prong means extending from one end of said conductive element in a first direction and a contact portion extending from the other end of said conductive element in a direction opposite said first direction;

said L-shaped grounding prong means including an orifice adapted to be superimposed on the ground aperture of a three aperture electrical outlet when said two prong means are inserted in a three aperture electrical outlet;

variable impedance means connected between two conductors of said interconnecting conductor means for temporarily interrupting current flow to said female receptacle at high voltage levels by creating a path of low resistance between said two interconnecting conductor means, said variable impedance means including a varistor in series with a thermofuse, said varistor and said thermofuse being in thermal cooperation whereby heat generated by said varistor causes said thermofuse to actuate and said thermofuse becomes an open circuit.

5. An interrupter device for interrupting electrical current used by a household electrical appliance and for diverting current from electrical equipment connected to telephone lines, comprising:

a housing supporting a plurality of prong means including a grounding prong means adapted to be inserted into an electrical outlet and a female receptacle adapted to receive the electrical plug connector of an appliance;

said housing being a substantially rectangular six sided closure having a front wall, a bottom wall and a back wall; said front wall including three apertures for said female recptical, said rear wall having two apertures and two of said prong means extending through said apertures substantially perpendicular to said rear wall, and said bottom wall including an aperture and said grounding prong means extending through said aperture substantially perpendicular to said bottom wall;

a plurality of conductor means for electrically interconnecting each of said prong means to a corresponding element of said female receptacle; and variable impedance means connected between two conductors of said interconnecting conductor means for temporarily interrupting current flow to said female receptacle at high voltage levels by creating a path of low resistance between said two interconnecting conductor means, said variable impedance means including a varistor in series with a thermofuse, said varistor and said thermofuse being in thermal cooperation whereby heat generated by said varistor causes said thermofuse to actuate and said thermofuse becomes an open circuit.

6. An interrupter device for interrupting electrical current to electrical equipment connected to telephone lines, comprising:

a housing supporting a plurality of male connector means adapted to be inserted into a telephone outlet, and a receptacle adapted to receive a telephone equipment electrical connector also suited to said outlet;

a plurality of connector means for electrically interconnecting each of said male connector means to a corresponding element of said receptacle;

a series circuit comprising a varistor and a thermofuse, said series circuit connected across at least two of said conductor means, said varistor and said thermofuse being in thermal cooperation, whereby heat generated by said varistor causes said thermofuse to actuate and become an open circuit; and a resistor, neon bulb and capacitor in series across said varistor, whereby current flow to said receptacle is interrupted when high voltage levels across said telephone lines decreases the impedance of said varistor and increases the heat output from said varistor thereby actuating said thermofuse.

7. The interrupter of claim 6 further comprising another capacitor in parallel with said neon bulb and a diode in parallel with said neon bulb whereby line oscillations are stopped.

8. The interrupter of claim 6 wherein said male connector means are prong means, said receptacle is a female receptacle, and said telephone equipment electrical connector is a plug type connector.

9. An interrupter device for interrupting electrical current to electrical equipment connected to telephone lines, comprising a housing supporting a coaxial male plug connection means adapted to be inserted into a coaxial telephone equipment outlet, and a coaxial female receptacle adapted to receive a telephone equipment coaxial connector suited to said telephone equipment outlet, coaxial conductor means for electrically interconnecting said coaxial male plug connection means to said coaxial female receptacle, a series circuit comprising a varistor and a thermofuse, said series circuit connected across separate conducting portions of said coaxial conductor means, said varistor and said thermofuse being in thermal cooperation, whereby heat generated by said varistor causes said thermofuse to actuate and become an open circuit; and a resistor, neon bulb and capacitor in series across said varistor, whereby current flow to said receptacle is interrupted when high voltage levels across said telephone lines decreases the impedance of said varistor and increases the heat output from said varistor thereby actuating said thermofuse.

* * * * *